US012673633B1

(12) United States Patent
Herzenstiel et al.

(10) Patent No.: US 12,673,633 B1
(45) Date of Patent: Jul. 7, 2026

(54) SELF-SUPPORTING AIRBAG ASSEMBLIES

(71) Applicant: AUTOLIV ASP, INC., Ogden, UT (US)

(72) Inventors: Frank J. Herzenstiel, Auburn Hills, MI (US); Changsoo Choi, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 19/225,941

(22) Filed: Jun. 2, 2025

(51) Int. Cl.
| | |
|---|---|
| *B60R 21/233* | (2006.01) |
| *B60R 21/205* | (2011.01) |
| *B60R 21/231* | (2011.01) |
| *B60R 21/2338* | (2011.01) |
| *B60R 21/239* | (2006.01) |

(52) U.S. Cl.
CPC .......... *B60R 21/233* (2013.01); *B60R 21/205* (2013.01); *B60R 21/231* (2013.01); *B60R 21/2338* (2013.01); *B60R 21/239* (2013.01); *B60R 2021/23308* (2013.01); *B60R 2021/23316* (2013.01); *B60R 2021/23382* (2013.01); *B60R 2021/23386* (2013.01)

(58) Field of Classification Search
CPC . B60R 21/233; B60R 21/205; B60R 21/2338; B60R 21/239; B60R 21/231; B60R 2021/23382; B60R 2021/23386; B60R 2021/23316; B60R 2021/23308; B60R 2021/23107
USPC ................ 280/728.1, 729, 732, 743.1, 743.2
See application file for complete search history.

(56) References Cited

U.S. PATENT DOCUMENTS

| | | | | |
|---|---|---|---|---|
| 10,857,966 | B2 * | 12/2020 | Deng | B60R 21/205 |
| 11,242,026 | B2 * | 2/2022 | Rosenberg | B60R 21/203 |
| 11,697,386 | B1 * | 7/2023 | Gould | B60R 21/231 |
| | | | | 280/728.3 |
| 12,208,765 | B1 * | 1/2025 | Jaradi | B60R 21/23138 |
| 12,269,413 | B1 * | 4/2025 | Taylor | B60R 21/2338 |
| 2003/0094794 | A1 * | 5/2003 | Amamori | B60R 21/233 |
| | | | | 280/729 |
| 2003/0214121 | A1 * | 11/2003 | Miyata | B60R 21/231 |
| | | | | 280/730.1 |
| 2006/0232050 | A1 * | 10/2006 | Kumagai | B60R 21/231 |
| | | | | 280/732 |
| 2011/0101660 | A1 * | 5/2011 | Schneider | B60R 21/206 |
| | | | | 280/731 |

(Continued)

FOREIGN PATENT DOCUMENTS

| | | | | | |
|---|---|---|---|---|---|
| DE | 19860804 | A1 * | 7/2000 | ........ | B60R 21/2338 |
| DE | 19860823 | A1 * | 7/2000 | ............ | B60R 21/20 |

(Continued)

*Primary Examiner* — Keith J Frisby
(74) *Attorney, Agent, or Firm* — Foley & Lardner LLP

(57) ABSTRACT

An airbag assembly includes an inflator to supply inflation gas, a main airbag cushion configured to receive inflation gas to expand and deploy toward a vehicle seating position, and a support airbag cushion. The main airbag cushion includes an impact surface to constrain occupant movement in a forward direction. The support airbag cushion expands and deploys from a position forward of the main airbag cushion to support it. The support airbag cushion has side tethers configured to constrain upward expansion and impart forward stiffness. The support airbag cushion also includes a support surface configured to restrain forward movement of the main airbag cushion.

15 Claims, 7 Drawing Sheets

200 —

(56)                    References Cited

U.S. PATENT DOCUMENTS

| | | | | |
|---|---|---|---|---|
| 2015/0158452 A1* | 6/2015 | Choi | B60R 21/231 | |
| | | | | 280/732 |
| 2016/0288761 A1* | 10/2016 | Jayasuriya | B60R 21/231 | |
| 2017/0282840 A1* | 10/2017 | Pendse | B60R 21/2338 | |
| 2019/0016291 A1* | 1/2019 | Paxton | B60R 21/2338 | |
| 2019/0161044 A1* | 5/2019 | Schneider | B60R 21/233 | |
| 2019/0381962 A1* | 12/2019 | Sheldon | B60R 21/205 | |
| 2021/0107426 A1* | 4/2021 | Choi | B60R 21/262 | |
| 2022/0185218 A1* | 6/2022 | Deng | B60R 21/233 | |
| 2022/0340098 A1* | 10/2022 | Zhou | B60R 21/239 | |
| 2023/0264646 A1* | 8/2023 | Barnes | B60R 21/205 | |
| | | | | 280/743.2 |
| 2024/0166158 A1* | 5/2024 | Suzuki | B60R 21/205 | |

FOREIGN PATENT DOCUMENTS

| | | | | | |
|---|---|---|---|---|---|
| DE | 202006001826 U1 * | 5/2006 | | B60R 21/231 | |
| DE | 102012019581 A1 * | 4/2013 | | B60R 21/231 | |
| DE | 102012023669 A1 * | 6/2014 | | B60R 21/2338 | |
| DE | 112020002201 T5 * | 1/2022 | | B60R 21/231 | |
| JP | 3769835 B2 * | 4/2006 | | | |
| JP | 2006088987 A * | 4/2006 | | | |
| JP | 2007196855 A * | 8/2007 | | | |
| JP | 5170068 B2 * | 3/2013 | | | |
| JP | 2021151807 A * | 9/2021 | | | |
| JP | 2025039304 A * | 3/2025 | | | |
| JP | 2025068889 A * | 4/2025 | | | |
| KR | 960010400 A * | 4/1996 | | B60R 21/233 | |
| WO | WO-2017222223 A1 * | 12/2017 | | B60R 21/239 | |
| WO | WO-2024137190 A1 * | 6/2024 | | B60R 21/21 | |
| WO | WO-2025100167 A1 * | 5/2025 | | B60R 21/2338 | |

* cited by examiner

SELF-SUPPORTING AIRBAG ASSEMBLIES

TECHNICAL FIELD

The present disclosure relates generally to the field of automotive occupant protection, or protection for occupants of motor vehicles. More specifically, the present disclosure relates to airbag assemblies.

BACKGROUND

Inflatable airbags are examples of automotive protective devices that may be mounted within a vehicle and may deploy during a collision event. The deployed airbag can cushion an occupant and prevent detrimental impact with other vehicular structures. Internal vehicle geometries can require corresponding airbag configurations to ensure the airbag contacts internal vehicle structures to support the airbag. Certain embodiments disclosed herein can address one or more of the challenges and issues with airbag configurations corresponding to internal vehicle geometries.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings

DETAILED DESCRIPTION

Figure 1:
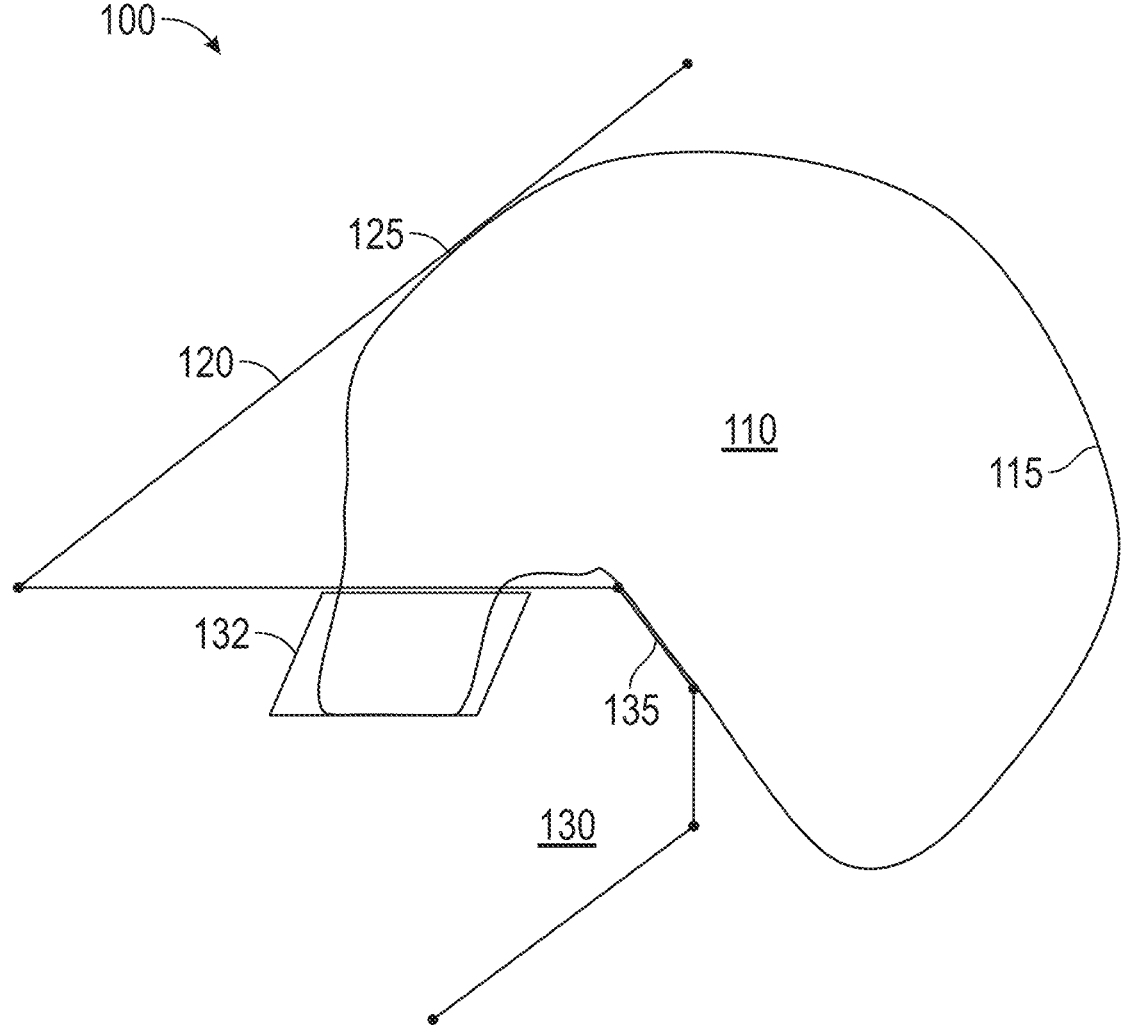
FIG. 1 illustrates a side view of an airbag system with a support structure, according to one or more embodiments of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Automotive protective devices may be used to prevent or mitigate injury to an automotive vehicle occupant in the event of a crash. Automotive protective devices may include seatbelts, airbags, nets, cushions, and other devices. Automotive protective devices may mitigate injuries caused by rapid deceleration of the vehicle occupant in the event of a crash. Automotive protective devices may prevent collision of the vehicle occupant with vehicle structures such as a beam, a dashboard, or other structures.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or seats, adjacent to a roof rail of the vehicle, in an overhead position, or at the knee or leg position.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

An airbag assembly, or airbag system, can mitigate injury to an occupant of a vehicle during a collision event by reducing the effect of impact of the occupant against structures (body-structure impact) within the vehicle (such as, e.g., a dashboard, or door column). The structures within the vehicle, and their specific geometries, can require specialized airbag dimensions, shapes, and deployment configurations to ensure that the airbag can successfully cushion the occupant. In an example, an airbag may be configured to contact a windshield and an instrument panel of the vehicle in order to counteract a force of the occupant on the airbag when cushioning the occupant.

Embodiments discussed herein may include an airbag assembly that addresses the technical problem of varying vehicle structures that interact with airbags in different ways. In some aspects, the airbag assembly may not rely upon internal vehicle surfaces to provide a reaction surface. Instead, the airbag assembly may be self-supporting, utilizing a support airbag cushion to provide a support surface for a main airbag cushion. The main airbag cushion may be configured to cushion an occupant during a collision event, with the support airbag cushion configured to support the main airbag cushion and resist movement of the main airbag cushion. This approach may allow for greater flexibility in airbag design and deployment, improving occupant protection across various vehicle interior geometries.

FIG. 1 illustrates a side view of an airbag system 100. The airbag system 100 may include an airbag cushion 110, a windshield 120, an instrument panel 130, and a housing 132. The airbag cushion 110 may be configured to deploy from the housing 132 towards a seating position of a vehicle. The airbag cushion 110 may expand upon receiving inflation gas from an inflator. During deployment, the airbag cushion 110 may contact a first reaction surface 125 on the windshield 120 and a second reaction surface 135 on the instrument panel 130. These contact points may provide support to the airbag cushion 110 during a collision event.

The airbag cushion 110 may include an impact surface 115 configured to constrain or otherwise limit movement of an occupant in a forward direction relative to the vehicle. in some implementations, when an occupant moves forward towards the windshield 120 during a collision, the airbag cushion 110 may transfer force to a first reaction surface 125 and a second reaction surface 135. This force transfer may help cushion the occupant and mitigate potential injuries.

The specific locations and geometries of the windshield 120 and instrument panel 130 determine the positioning and orientation of the reaction surfaces 125, 135. In some aspects, variations in vehicle interior designs may result in different spatial relationships between these components. As a result, the airbag cushion 110 may need to be configured in different ways to properly deploy against the reaction surfaces 125, 135. For example, in vehicles with more steeply angled windshields, the airbag cushion 110 may require a different shape or deployment path to effectively contact the first reaction surface 125. Similarly, instrument panels 130 with varying depths or contours may necessitate adjustments to a lower portion of the airbag cushion 110 to ensure proper contact with the second reaction surface 135. These considerations may lead to the development of multiple airbag cushion configurations to accommodate diverse vehicle interior geometries while maintaining optimal occupant protection. These various airbag cushion configurations introduce complexity into airbag design and manufacturing, requiring custom designs and individualized testing for each vehicle geometry.

Figure 2A:
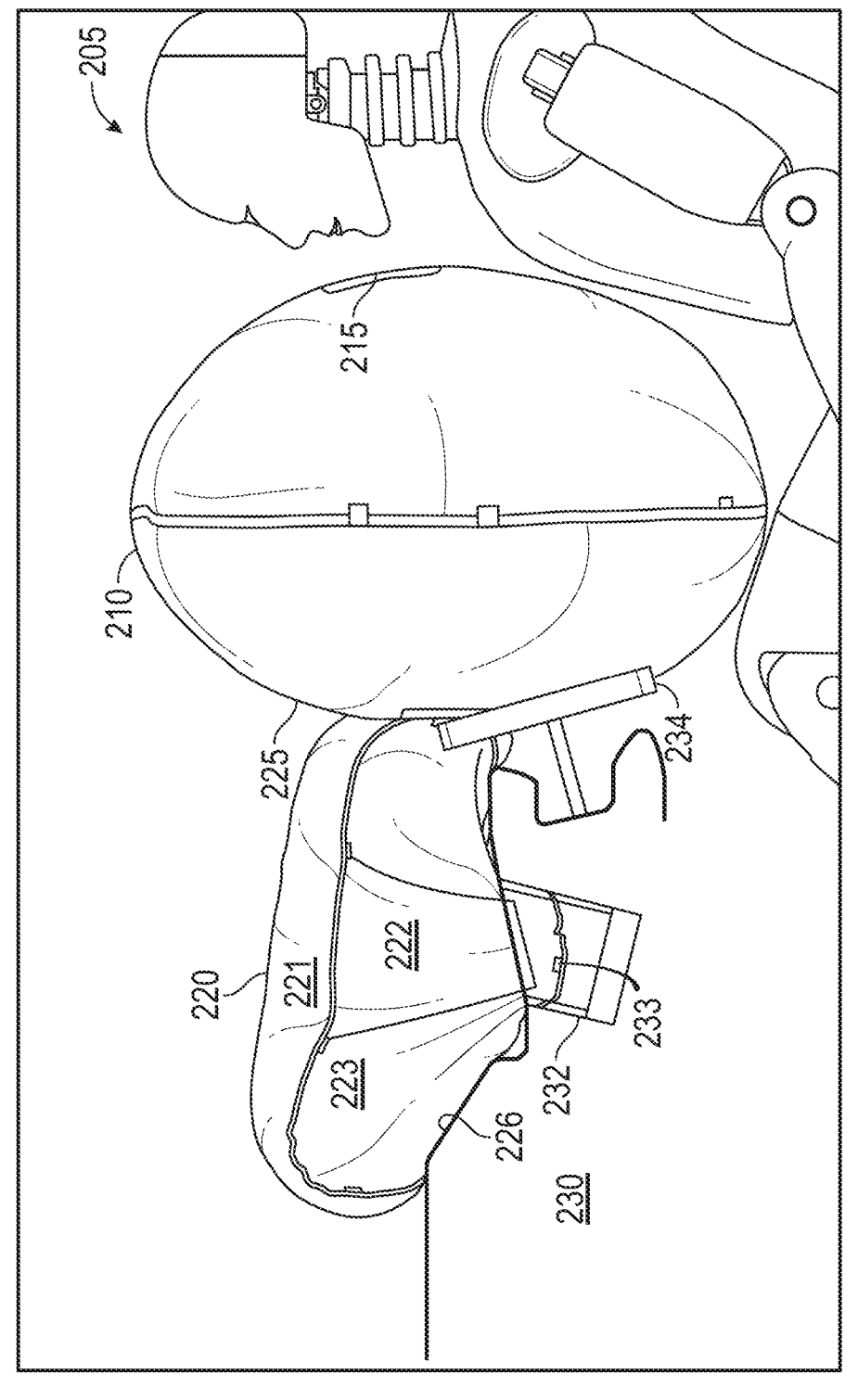
FIG. 2A illustrates a side view of an airbag system including a main airbag cushion and a support airbag cushion, according to one or more embodiments of the present disclosure.

FIG. 2A illustrates a side view of an airbag system 200 including a main airbag cushion 210 and a support airbag cushion 220, according to one or more embodiments of the present disclosure. The main airbag cushion 210 may be configured to receive inflation gas to expand and deploy toward the occupant seating position 205 of a vehicle. The main airbag cushion 210 may include an impact surface 215 configured to constrain, restrict, or otherwise limit movement of an occupant in an occupant seating position 205 in a forward direction relative to the vehicle (i.e., toward a front of the vehicle, toward a windshield of the vehicle).

The impact surface 215 may be configured to receive an occupant from the occupant seating position 205 during a collision event. The impact surface 215 may limit or restrict the forward movement of the occupant during the collision event, helping to prevent contact with the windshield or other vehicle structures located forward of the occupant seating position 205. The main airbag cushion 210 may have a simple two-dimensional symmetric design. This design may allow the main airbag cushion 210 to be used across various vehicle models, potentially reducing manufacturing complexity and costs. The main airbag cushion 210 may be designed for primarily one-dimensional expansion in the fore-and-aft direction of the vehicle. In an example, the main airbag cushion 210 deploys and expands primarily toward a rear of the vehicle (i.e., away from the windshield). This controlled expansion may contribute to the stability and repeatability of the airbag deployment, potentially improving occupant protection consistency across different collision scenarios. In some implementations, the main airbag cushion 210 may have a volume of approximately 95 liters when fully inflated.

The main airbag cushion 210 can be configured with either a two-dimensional or three-dimensional design depending on the support requirements of the specific application. In implementations where the main airbag cushion 210 operates without the support airbag cushion 220, the main airbag cushion 210 may require a complex three-dimensional design to enable the main airbag cushion 210 to contact and brace against multiple vehicle surfaces such as the windshield, instrument panel, or other interior structures. The complex three-dimensional design may include contoured surfaces, specialized chambers, or asymmetric shapes that allow the main airbag cushion 210 to conform to specific vehicle geometries and provide adequate reaction forces during occupant impact. In contrast, when the support airbag cushion 220 provides structural support to the main airbag cushion 210, the main airbag cushion 210 can use a simpler two-dimensional symmetric design. The support airbag cushion 220 can provide the reaction surface and structural resistance that would otherwise require the main airbag cushion 210 to contact vehicle surfaces directly. This configuration allows the main airbag cushion 210 to focus on occupant protection rather than structural support, enabling a standardized design that can be implemented across various vehicle types without modification. In this way, the support airbag cushion 220 can be used to provide support to the main airbag cushion 210 independent of the design of the main airbag cushion 210, and the design of the main airbag cushion 210 can be simplified due to the support provided by the support airbag cushion 220.

The main airbag cushion 210 may be designed to be common for any vehicle. This universal design approach may allow for greater flexibility in airbag implementation across different vehicle models and interior configurations. In some implementations, this commonality may simplify inventory management and reduce production costs while maintaining effective occupant protection.

The support airbag cushion 220 is configured to expand and deploy from a position forward of the main airbag cushion 210 to support the main airbag cushion 210. The support airbag cushion 220 may be positioned between the main airbag cushion 210 and a forward portion of the vehicle, such as the windshield or instrument panel 230. In some implementations, the support airbag cushion 220 has a volume that is smaller than the volume of the main airbag cushion 210. In an example, the support airbag cushion 220 may have a volume of approximately 20 liters when fully inflated.

The support airbag cushion 220 may include side tethers 222. The side tethers 222 can be positioned on an exterior of the support airbag cushion 220. The side tethers 222 may be configured to constrain an upward expansion of the support airbag cushion 220 and impart stiffness to the support airbag cushion 220 in the forward direction. In some implementations, the side tethers 222 may limit movement of the support airbag cushion 220, reduce deformation of the support airbag cushion 220, and/or limit rotation of the support airbag cushion 220. This configuration may allow the support airbag cushion 220 to provide stable resistance to movement of the main airbag cushion 210, resulting in a consistent support force from the support airbag cushion 220 on the main airbag cushion 210. In some embodiment, the support airbag cushion 220 may resist movement of the main airbag cushion 210 (i.e., provide a reaction force to the main airbag cushion 210) without contacting a windshield of the vehicle. In some implementations, the side tethers 222 are coupled to the housing 232 (e.g., inflator housing) at a first end and to an upper surface of the support airbag cushion 220 at a second end. In some implementations, the side tethers 222 are coupled to a lower portion of the support airbag cushion 220 at a first end and to an upper surface of the support airbag cushion 220 at a second end. In some implementations, the side tethers 222 are a single tether that extends over a top surface of the support airbag cushion 220.

Stated otherwise, in some implementations, the side tethers 222 can be integrated together into (or to form) a single tether that extends over a top surface of the support airbag cushion 220.

In some implementations, a width of the side tethers 222 may extend along at least a quarter of a length of the support airbag cushion 220 in the forward direction, to provide lateral support and stability to the support airbag cushion 220 during deployment and impact. In some implementations, the width of the side tethers 222 extends along half of the length of the support airbag cushion in the forward direction. In some implementations, the side tethers 222 include multiple segments on each side of the support airbag cushion 220 to increase a stiffness of the support airbag cushion 220. The width of the side tethers 222 may restrict movement and/or deformation of the support airbag cushion 220, increasing a support force or a reaction force the support airbag cushion 220 can provide at the first support surface 225. The side tethers 222 may provide resistance to movement of the support airbag cushion 220 in the forward direction due to their surface area and tensile strength. Additionally, the side tethers 222 may resist rotational movement of the support airbag cushion 220 by distributing forces over a larger area and creating a more stable connection between the upper and lower portions of the support airbag cushion 220. The side tethers 222 can resist, limit, or constrain deformation of the support airbag cushion 220 by providing increased stiffness to the sides of the support airbag cushion 220 to constrain a deployed shape of the support airbag cushion 220. The greater the width dimension of the side tethers 222, the greater resistance the side tethers 222 can provide against movement (translation, rotation) and/or deformation of the support airbag cushion 220 from forces from or via the main airbag cushion 210.

Figure 2B:
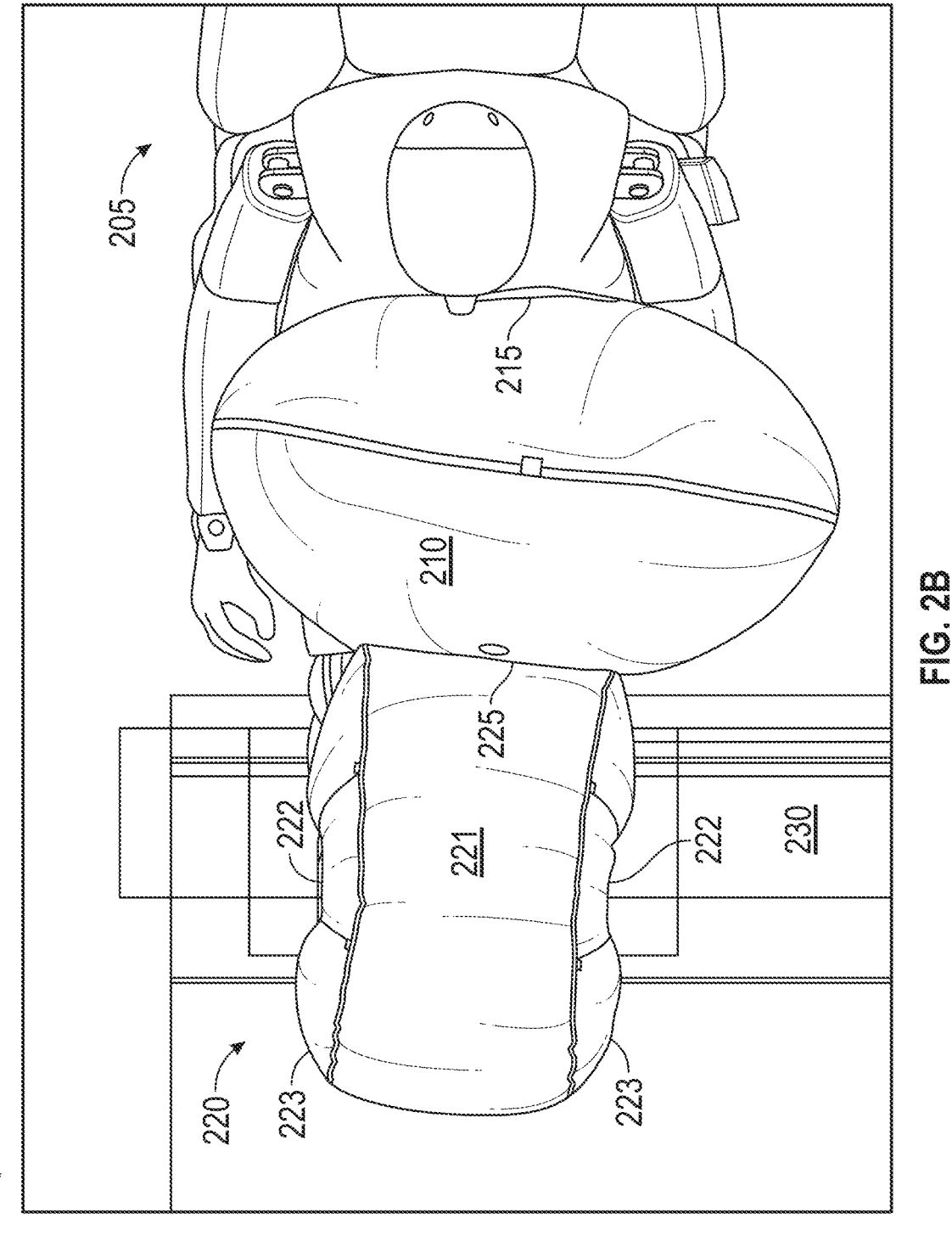
FIG. 2B illustrates a top view of the airbag system of FIG. 2A, according to one or more embodiments of the present disclosure.

In some implementations, the support airbag cushion 220 may be twice as long in the forward direction as in a lateral direction perpendicular to the forward direction, as illustrated in FIG. 2B. This elongated shape may allow the support airbag cushion 220 to provide effective support to the main airbag cushion 210 while maintaining a relatively compact lateral profile. The elongated shape may provide a greater surface area for limiting forward movement (e.g., translational, rotational) of the support airbag cushion 220. The support airbag cushion 220 may include a support surface panel 221 and two side panels 223. In some implementations, the support airbag cushion 220 may include exposed seams on an external surface of the support airbag cushion 220. Seams between the support surface panel 221 and the two side panels 223 may be exposed seams. These exposed seams may simplify the manufacturing process and potentially reduce production costs. Stated otherwise, exposed seams may allow simpler and/or more cost-efficient manufacturing. The main airbag cushion 210 may include hidden seams that are located within the main airbag cushion 210 to provide a smooth surface to protect the occupant. However, as the support airbag cushion 220 is configured to receive the main airbag cushion 210 and not the occupant, the support airbag cushion 220 can include exposed seams, reducing manufacturing complexity of the support airbag cushion 220.

The support airbag cushion 220 may include a first support surface 225 configured to restrain movement of the main airbag cushion 210 in the forward direction. The first support surface 225 may provide support to the main airbag cushion 210 by providing a support force or a reactive force to cushion an impact of the occupant on the impact surface 215 of the main airbag cushion 210. In some implementations, the first support surface 225 may be configured to form a combined surface with a surface of a steering wheel 234. This configuration may enhance the stability and effectiveness of the support provided to the main airbag cushion 210.

The support airbag cushion 220 may include a second support surface 226 configured to contact the instrument panel 230 of the vehicle, as illustrated in FIG. 2A. The second support surface 226 in contact with the instrument panel 230 may provide a reactive force to the support airbag cushion 220, further enhancing its stability and ability to support the main airbag cushion 210. This dual support surface configuration may allow the support airbag cushion 220 to effectively transfer forces between the main airbag cushion 210 and the vehicle structure (i.e., the instrument panel 230), improving overall occupant protection.

In an example, an occupant moves forward during a collision event and impacts the impact surface 215 of the main airbag cushion 210. The force of this impact is distributed across the impact surface 215 and/or through the main airbag cushion 210 and transferred to the first support surface 225 of the support airbag cushion 220. The support airbag cushion 220 then compresses and deforms in a limited manner due to the side tethers 222, transferring the force through its structure to the second support surface 226. The second support surface 226 transfers the force to the instrument panel 230, allowing the force to be ultimately transferred to the vehicle structure. This force transfer pathway may allow the airbag system 200 to effectively dissipate the energy of the occupant's impact across multiple components and surfaces, potentially reducing the peak forces experienced by the occupant and improving overall protection.

In some implementations, the support airbag cushion 220 may not include a second support surface 226, or the second support surface 226 may not meet resistance from the instrument panel 230 in the forward direction. In such configurations, the force transfer pathway may differ from the previously described example. Instead of transferring force to the instrument panel 230, the support airbag cushion 220 may primarily transfer force to the housing 232. The stiffness of the support airbag cushion 220 provided by the geometry of the support airbag cushion 220 and the side tethers 222 provides for effective transfer of force to the housing 232. In an example, if the instrument panel 230 does not provide a surface to resist movement of the support airbag cushion 220 in the forward direction, the instrument panel 230 may resist movement of the support airbag cushion 220 downward into the instrument panel 230 such that the second support surface 226 transfers force to the instrument panel 230 due to rotation of the support airbag cushion 220 (i.e., in a counter-clockwise direction from the perspective in FIG. 2A. The side tethers 222 may resist deformation of the support airbag cushion 220 such that rotational movement of the support airbag cushion 220 is limited and is effectively resisted by the instrument panel 230. Thus, the second support surface 226 may provide a reactive force to the support airbag cushion 220 in a rearward direction (i.e., when the instrument panel 230 resists forward movement of the support airbag cushion 220) and/or in an upward direction (i.e., when the instrument panel 230 resists downward or rotational movement of the support airbag cushion 220).

The geometry of the support airbag cushion 220 and the side tethers 222 may allow the support airbag cushion 220 to effectively resist movement of the main airbag cushion 210 independent of a geometry of the instrument panel 230

(and/or independent of a geometry of other elements of an interior of the vehicle). Thus, the support airbag cushion 220 may allow for greater flexibility in vehicle interior design, as the airbag system 200 may not rely on specific instrument panel 230 geometries for support. The airbag system 200 may be self-supporting, as the support airbag cushion 220 is configured to maintain its shape and position in order to support the main airbag cushion 210 independent of vehicle geometry. The airbag system 200 may be installed in a variety of vehicles having various different configurations of instrument panels, windshields, and other elements, reducing manufacturing complexity while providing consistent support for the main airbag cushion 210 in order to protect occupants.

The support airbag cushion 220 may include a vent in the first support surface 225 to provide inflation gas to the main airbag cushion 210. In some implementations, the airbag system 200 may include one or more of baffles and valves at the vent to maintain an inflation pressure of the support airbag cushion 220 higher than an inflation pressure of the main airbag cushion 210. This pressure differential may help ensure that the support airbag cushion 220 remains sufficiently rigid to provide effective support to the main airbag cushion 210 throughout the deployment process and/or throughout ride down. A higher pressure in the support airbag cushion 220 than in the main airbag cushion 210 can ensure that the main airbag cushion 210 can effectively be compressed between an occupant and the first support surface 225 and that the support airbag cushion 220 can maintain its position to limit forward movement of the main airbag cushion 210. A loop diffuser may be positioned at the interface of the support airbag cushion 220 and main airbag cushion 210 (e.g., at the first support surface 225) to mitigate punch-out force on the main airbag cushion 210, potentially reducing the risk of damage to the main airbag cushion 210 and/or the support airbag cushion 220 during rapid inflation.

The airbag system 200 may include additional features to enhance the interaction between the support airbag cushion 220 and the main airbag cushion 210. In some implementations, one or more stabilizer straps may be included between the support airbag cushion 220 and the main airbag cushion 210 to help maintain their relative positions during deployment. The one or more stabilizer straps may extend within the support airbag cushion 220 and connect to an interior of the first support surface 225. The one or more stabilizer straps may extend along an exterior of the support airbag cushion 220. In an example, the stabilizer strap extends from the housing 232 along an underside of the support airbag cushion 220 to attach to the main airbag cushion 210 at a bottom point of the first support surface 225.

The housing 232 may be configured to contain both the main airbag cushion 210 and the support airbag cushion 220 in a folded and/or compressed state prior to deployment. In some cases, the housing 232 may include an inflator housing that houses an inflator 233 for providing inflation gas to the airbag cushions. The housing 232 is positioned forward of the occupant seating position 205. In some implementations, the housing 232 may be designed to accommodate different mounting angles and/or lateral offset positions. This flexibility in mounting options may allow the airbag system 200 to be installed in various vehicle models with different interior configurations. An ability to adjust the mounting angle and position may help ensure optimal airbag deployment trajectories across different vehicle designs. In an example, the airbag system 200 may be installed in a vehicle where ventilation ducts or other features require the housing

232 to be installed in a position offset from the occupant seating position 205. In this example, the housing 232 can be installed at an angle to provide the main airbag cushion 210 in a position forward of the occupant seating position 205.

The side tethers 222 of the support airbag cushion 220 may be coupled to the housing 232 at one end. The side tethers 222 may extend from a lower portion of the housing 232 to an upper surface of the support airbag cushion 220. This configuration may help control the deployment shape and provide stability to the support airbag cushion 220 during inflation by transferring impact forces to the housing 232. In some cases, the housing 232 may include specific attachment points or reinforced areas designed to withstand the forces exerted by the side tethers 222 during airbag deployment. These attachment points may be integrated into the structure of the housing 232 or may be separate components affixed to the housing 232.

FIG. 2B illustrates a top view of the airbag system 200 of FIG. 2A, according to one or more embodiments of the present disclosure. As illustrated in FIG. 2B, the support airbag cushion 220 may have an elongated shape in the forward direction, with the first support surface 225 positioned to directly interface with the main airbag cushion 210. The elongated shape of the support airbag cushion 220 may enable it to resist forward movement of the main airbag cushion 210 by providing a stable base against which the main airbag cushion 210 can be compressed due to impact of an occupant on the impact surface 215. The elongated shape of the support airbag cushion 220 may enable it to resist deformation and/or rotation. The side tethers 222 may further limit or constrain deformation and/or rotation of the support airbag cushion 220 such that the support airbag cushion 220 provides a stable support for the main airbag cushion 210.

Figure 2C:
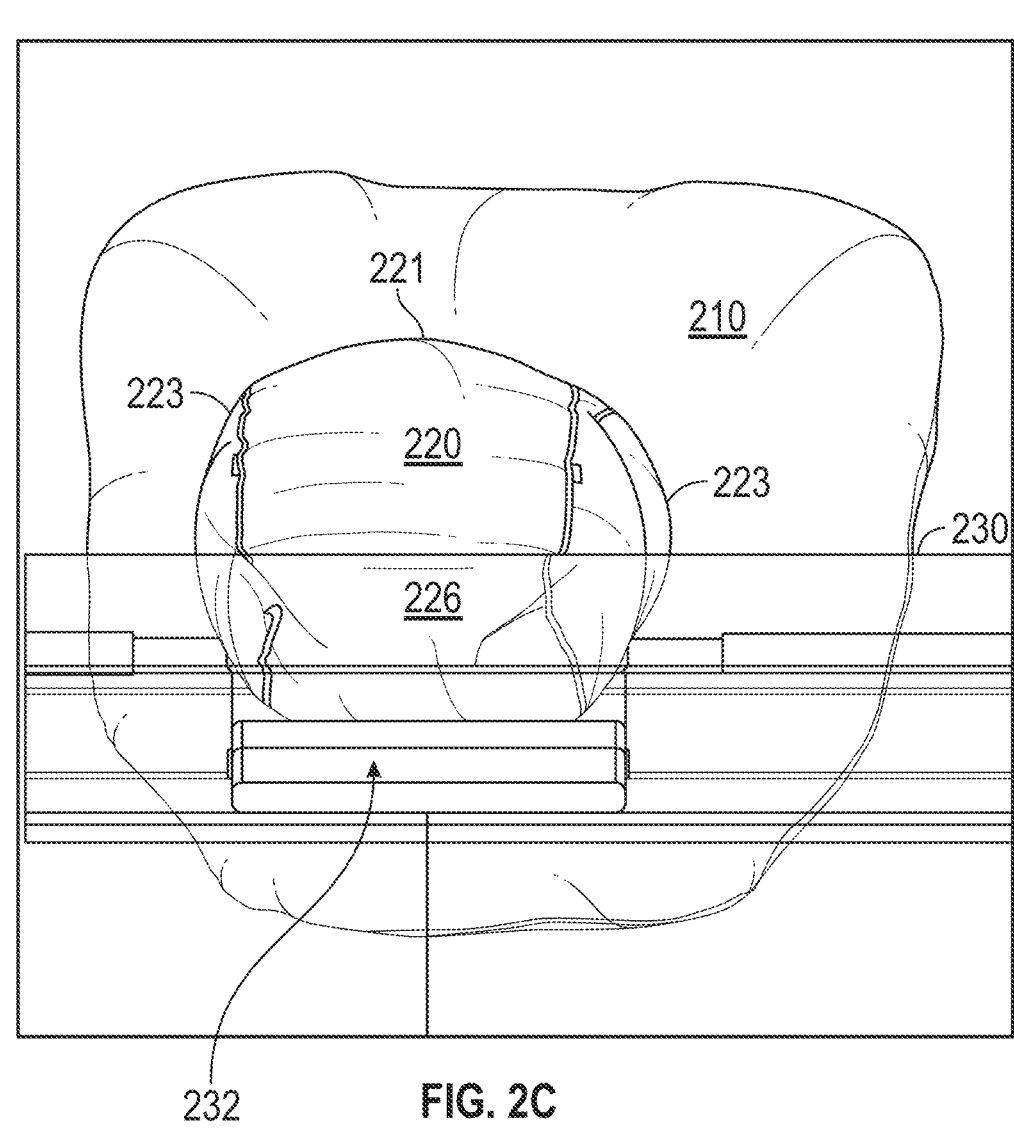
FIG. 2C illustrates a front view of the airbag system of FIG. 2A, according to one or more embodiments of the present disclosure.

FIG. 2C illustrates a front view of the airbag system 200 of FIG. 2A, according to one or more embodiments of the present disclosure. The second support surface 226 may extend along a lower portion of the support airbag cushion 220. In some implementations, the second support surface 226 may contact the instrument panel 230. As the support airbag cushion 220 deploys, the second support surface 226 may initially deploy upward and out of the housing 232 and then expand downward and forward, potentially making contact with the instrument panel 230. This contact may occur due to the deployment of the support airbag cushion 220, or it may occur due to the main airbag cushion 210 pressing on the support airbag cushion 220. The interaction between the second support surface 226 and the instrument panel 230 may provide additional stability to the overall airbag system 200 during deployment and occupant impact events. The main airbag cushion 210 may be compressed between the occupant and the support airbag cushion 220. In some implementations, the support airbag cushion 220 is compressed between the main airbag cushion 210 and the instrument panel 230. In some implementations, the support airbag cushion 220 is compressed by the main airbag cushion 210 but maintains its shape due to its geometry and the side tethers 222, as illustrated in FIG. 3.

The main airbag cushion 210, the support airbag cushion 220, and the inflator 233 may form an airbag assembly. During deployment, the inflator 233 supplies inflation gas which is provided to the support airbag cushion 220 to cause the support airbag cushion 220 to expand and deploy. As described herein, the support airbag cushion 220 can include a vent in the first support surface 225 to provide the inflation gas to the main airbag cushion 210 to expand and deploy. In some implementations, the airbag assembly can include multiple inflators. In an example, the airbag assembly includes a first inflator to provide inflation gas to the main airbag cushion 210 and a second inflator to provide inflation gas to the support airbag cushion 220. In this example, the main airbag cushion 210 and the support airbag cushion 220 may be separately provided with inflation gas from separate inflators, such that the main airbag cushion 210 does not rely upon the support airbag cushion 220 to provide inflation gas.

Figure 3:
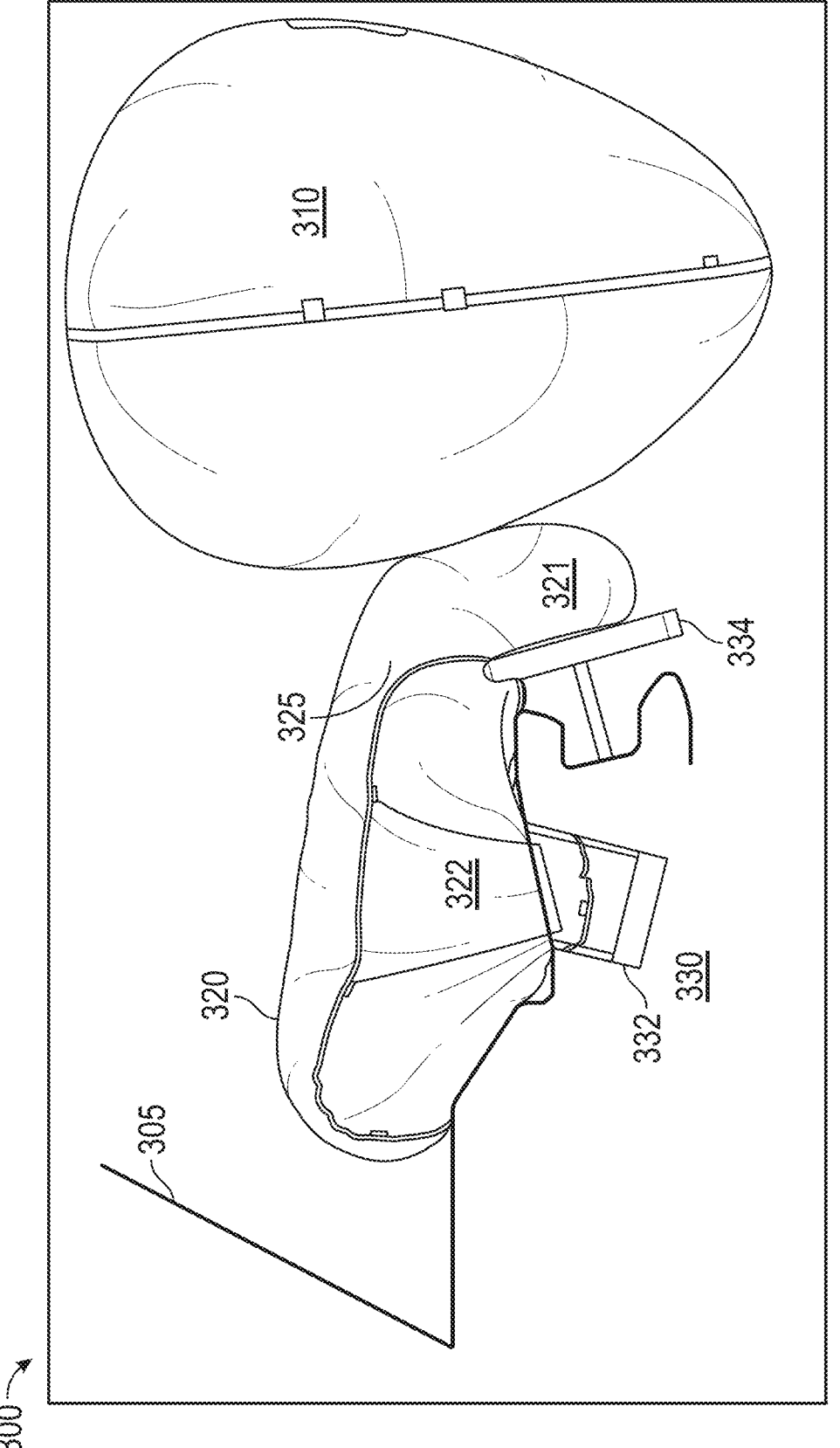
FIG. 3 illustrates a side view of an airbag system with a main airbag cushion and a support airbag cushion that extends over a steering wheel, according to one or more embodiments of the present disclosure.

FIG. 3 illustrates a side view of an airbag system 300, which is similar to the airbag system 200 of FIGS. 2A-2C. The airbag system 300 includes a main airbag cushion 310 and a support airbag cushion 320. However, in this configuration, the support airbag cushion 320 includes a protrusion 321 which deploys between a steering wheel 334 and the main airbag cushion 310. The protrusion 321 may extend from a main body of the support airbag cushion 320. The protrusion 321 may extend in a different direction than the main body of the support airbag cushion 320. The protrusion 321 may extend transversely from a main body of the support airbag cushion 320. In an example, the protrusion 321 may extend substantially perpendicular to the main body of the support airbag cushion 320. A support surface 325 of the support airbag cushion 320 may be formed by the main body of the support airbag cushion 320 and/or the protrusion 321. The support surface 325 of the support airbag cushion 320 is configured to restrain movement of the main airbag cushion 310 in the forward direction. The support airbag cushion 320 includes side tethers 322 on its exterior, which can constrain upward expansion and impart stiffness to the support airbag cushion 320.

The protrusion 321 may be compressed between the main airbag cushion 310 and the steering wheel 334. The main airbag cushion 310 may be compressed between an occupant and the protrusion 321 and/or the main body of the support airbag cushion 320. The support surface 325 may resist movement of the main airbag cushion 310 due to compression of the protrusion 321 between the main airbag cushion 310 and the steering wheel 334 and/or compression of the support airbag cushion 320 in the forward direction, as resisted by the structure of the support airbag cushion 320 including the side tethers 322. The support airbag cushion 320 may resist movement of the main airbag cushion 310 (i.e., provide a reaction force to the main airbag cushion 310) without contacting a windshield 305 of the vehicle. In some implementations, the support airbag cushion 320 does not rely upon contact with an instrument panel 330 of the vehicle. The support airbag cushion 320 deploys from a housing 332 within the instrument panel 330 and can transfer impact forces to the instrument panel 330 via the housing 332. In this way, the airbag assembly formed by the main airbag cushion 310 and the support airbag cushion 320 can be self-supporting and can be installed in a variety of vehicles, independent of internal vehicle geometry.

The airbag assembly formed by the main airbag cushion 310 and the support airbag cushion 320 can be installed in a variety of vehicles having different configurations of instrument panels, windshields, and steering wheels. As the support airbag cushion 320 does not rely upon any specific structure or configuration of the instrument panel 330 or the windshield 305 to provide support to the main airbag cushion 310, the airbag assembly can be installed and function to protect vehicle occupants in a variety of vehicles. In this way, a portion of the airbag assembly can be a standardized sub-assembly for installation in a wide variety of vehicles.

The airbag assembly may be installed in various vehicle types and configurations. In some implementations, the airbag assembly may be mounted in compact cars with limited dashboard space, where the support airbag cushion's ability to provide a stable reaction surface without relying on specific instrument panel geometries may be particularly advantageous. The assembly may also be suitable for installation in larger vehicles such as SUVs or minivans with deeper instrument panels where contact with the windshield is not feasible. In some cases, the airbag assembly may be installed in sports cars with steeply angled windshields, leveraging the support airbag cushion's ability to deploy effectively without requiring contact with the windshield. The assembly may also be adapted for use in electric vehicles with unconventional dashboard layouts, where the flexibility in mounting options may allow for integration with novel interior designs. Additionally, the standardized nature of the airbag assembly may facilitate its installation across multiple vehicle models within a manufacturer's lineup, potentially streamlining production processes and reducing costs associated with model-specific airbag designs.

Figure 4A:
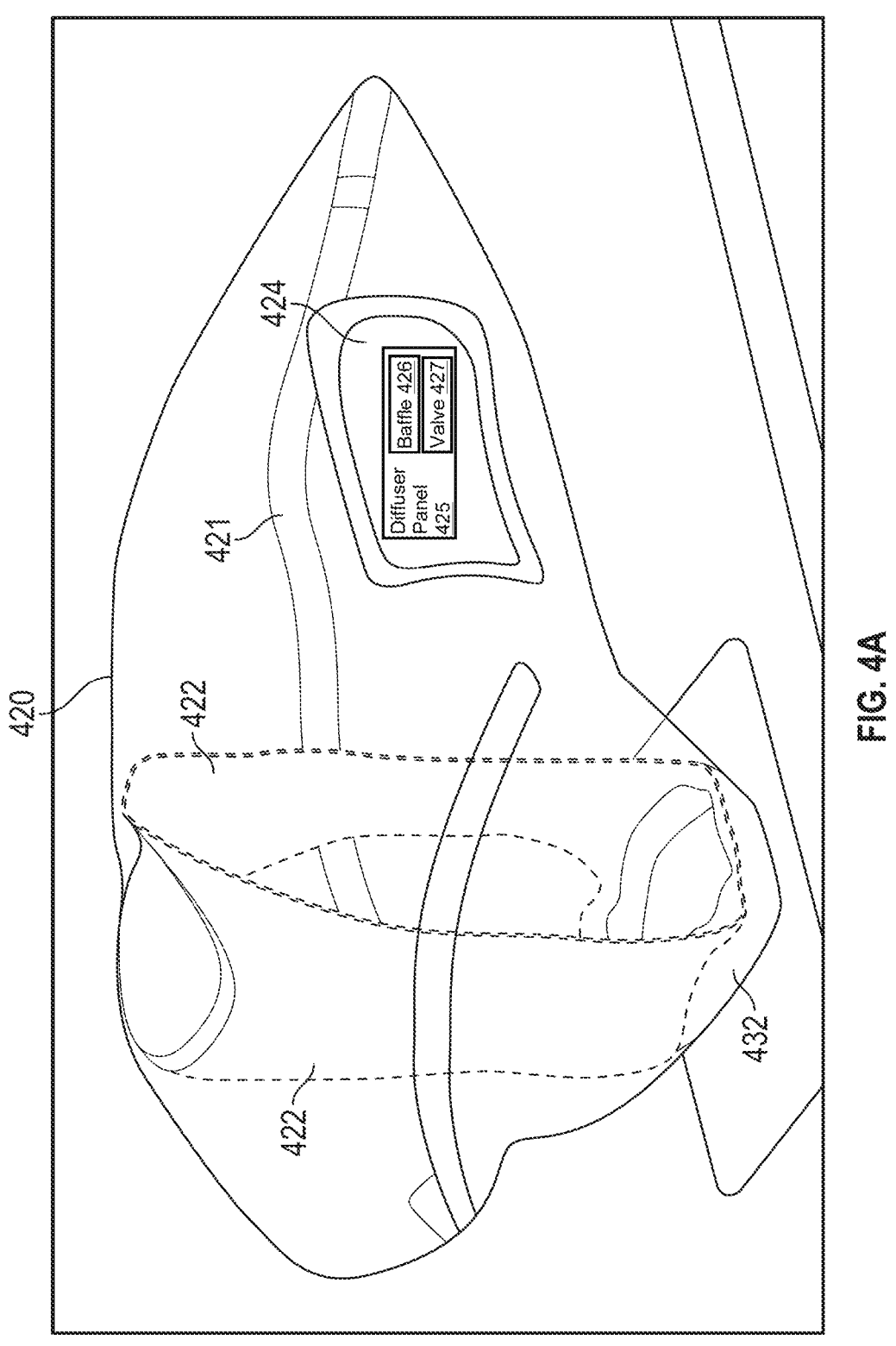
FIG. 4A illustrates a support airbag cushion including internal side tethers.

FIG. 4A illustrates a support airbag cushion 420 including internal side tethers 422 that may be used in the airbag systems described herein. The support airbag cushion 420 may include internal side tethers 422 positioned within the interior of the support airbag cushion 420. These internal side tethers 422 may extend from a lower portion of the support airbag cushion 420 to an upper portion, providing structural support and helping to control the shape of the support airbag cushion 420 during deployment. In some implementations, the internal side tethers 422 may be attached to the housing 432 at their lower ends and to an upper surface of the support airbag cushion 420 at their upper ends. In an example, the internal side tethers 422 are held against the housing 432 by a plate and/or bolts and sewn to the upper surface of the support airbag cushion 420. In an example, the internal side tethers 422 are sewn to the support airbag cushion 420 at both ends of the internal side tethers 422 and the housing 432 is attached to the internal tethers 422 and the support airbag cushion 420 using studs or rivets. This configuration may allow the internal side tethers 422 to transfer forces directly from the upper portion of the support airbag cushion 420 to the housing 432, potentially enhancing the stability and shape control of the support airbag cushion 420 during deployment.

In some implementations, the support airbag cushion 420 may be formed from a single panel of material. This single-panel construction may simplify manufacturing processes and potentially reduce production costs. The panel may be folded and sewn to create the three-dimensional shape of the support airbag cushion 420. A seam 421 may be visible on the exterior of the support airbag cushion 420, indicating where edges of the panel have been joined together. In some implementations, the internal side tethers 422 are attached or sewn to sides of the support airbag cushion 420 at the seam 421.

The support airbag cushion 420 may also include a vent 424 that allows for the transfer of inflation gas to a main airbag cushion. The vent 424 may be positioned on a surface of the support airbag cushion 420 that interfaces with the main airbag cushion. In some cases, the vent 424 may be formed as an opening in the panel 423 during the cutting or manufacturing process.

Figure 4B:
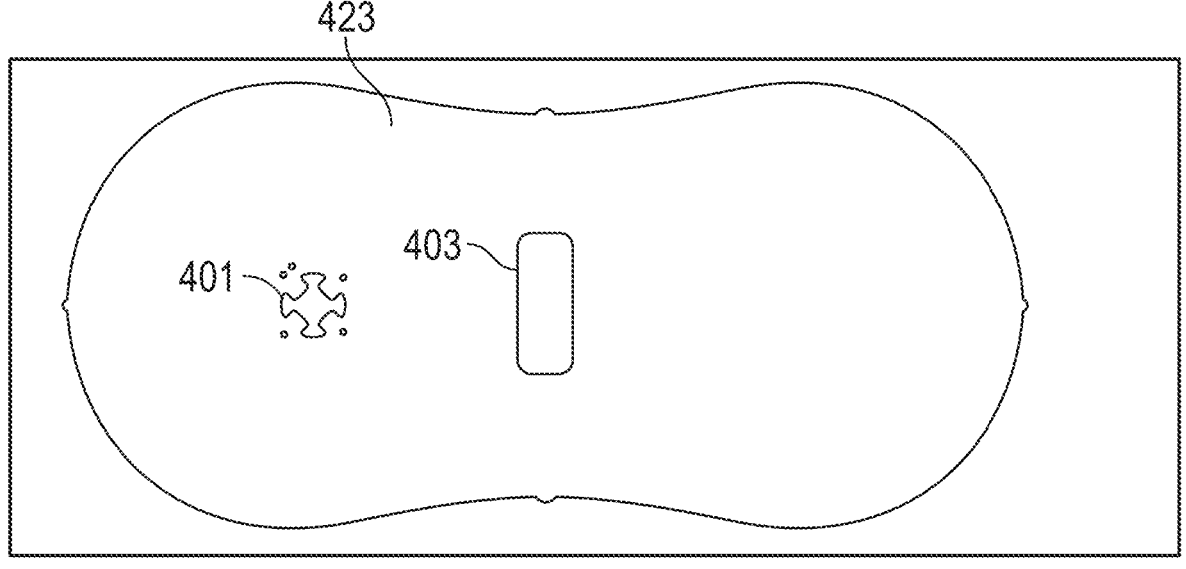
FIG. 4B illustrates panels of the support airbag cushion of FIG. 4A and panels of the internal side tethers of FIG. 4A.
Figure 4B:
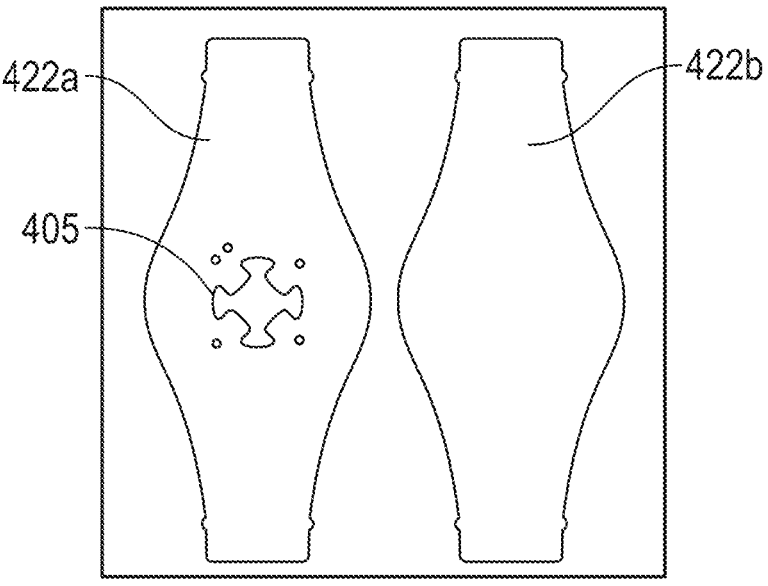

FIG. 4B illustrates panels of the support airbag cushion 420 of FIG. 4A and panels of the internal side tethers of FIG. 4A. A single panel 423 forms the main body of the support airbag cushion 420 and may be cut from a single piece of fabric material. The panel 423 includes an inflator opening 401 configured to allow inflation gas from an inflator to enter the support airbag cushion 420 and a vent opening 403 configured to allow inflation gas to flow from the support airbag cushion 420 to a main airbag cushion. One or more attachment sites may be located adjacent the inflator opening 401 in the panel 423. In an example, the attachment sites are configured to receive bolts to bolt the panel 423 to the housing 432.

The internal side tethers 422 of FIG. 4A may be formed from first side tether portion 422a and second side tether portion 422b. The first side tether portion 422a and second side tether portion 422b may be separate fabric pieces that are sewn or otherwise attached to each other to form the side tethers 422. The first side tether portion 422a includes an inflator opening 405. The first side tether portion 422a may be attached to the housing 432 such that inflation gas passes through the inflator opening 405. In an example, the inflator opening 401 of the panel 423 is placed on the housing 432 and the inflator opening 405 of the first side tether portion 422a such that inflation gas passes through the inflator opening 401 and the inflator opening 405 to enter the support airbag cushion 420.

In some implementations, the central area of the first side tether portion 422a surrounding the inflator opening 405 may be attached (e.g., bolted) to the housing 432. The central area of the second side tether portion 422b may be sewn or otherwise affixed to the panel 423 of the support airbag cushion 420. The ends of the first side tether portion 422a and the second side tether portion 422b are sewn or otherwise affixed together to form the side tethers 422. The combination of attaching the first side tether portion 422a to the housing 432 and sewing the second side tether portion 422b to the panel 423 may create a robust tether system that helps control the shape and deployment characteristics of the support airbag cushion 420.

When assembled, the panel 423 is folded and sewn along its edges to create the three-dimensional shape of the support airbag cushion 420. The first side tether portion 422a and second side tether portion 422b are attached to the panel 423 to form the internal side tethers 422 that provide structural support and shape control to the support airbag cushion 420. This construction method allows for efficient manufacturing while providing the necessary structural integrity and performance characteristics for the support airbag cushion 420 to effectively support a main airbag cushion during deployment.

In some implementations, the support airbag cushion may include a diffuser panel 425 positioned near the vent to direct and distribute the flow of expansion gas from the support airbag cushion into the main airbag cushion. The diffuser panel 425 may be configured as a fabric structure with multiple openings or perforations arranged in a pattern to promote even gas distribution. This arrangement may help to reduce localized high-pressure areas and mitigate potential damage to the main airbag cushion during rapid inflation. The diffuser panel 425 may be sewn or otherwise attached to the support airbag cushion, surrounding or adjacent the vent opening.

The diffusion of the gas flow may help to distribute the inflation forces more evenly across the interface between the support airbag cushion and the main airbag cushion, potentially reducing the risk of localized stress or damage to the main airbag cushion fabric. The loop diffuser panel 425 may also incorporate baffles 426, valves 427, or internal partitions to further control gas flow and promote more uniform distribution. By incorporating such a loop diffuser panel 425, the airbag assembly may achieve improved inflation characteristics and enhanced overall performance across various deployment scenarios.

In some implementations, the diffuser panel 425 may take the form of a cylindrical or semi-cylindrical structure with perforations along its circumference, allowing gas to be expelled radially in multiple directions. In an example, a diffuser panel may comprise a tubular fabric structure approximately 100 mm in length and 50 mm in diameter, with a series of small openings (e.g., 2-5 mm in diameter) distributed evenly along its surface. As inflation gas enters the diffuser from one end, it may be forced to change direction and exit through the multiple openings, effectively breaking up the gas flow and reducing its velocity.

In some implementations, the diffuser panel 425 may be configured as a panel of material positioned adjacent the vent 424 to direct expansion gas downwards, facilitating the expansion of the main airbag cushion in a downward direction. This downward-directed gas flow may help to shape the deployment of the main airbag cushion, potentially improving its ability to provide protection in specific areas. In an example, the main airbag cushion may expand downwards to cover a steering wheel, providing additional protection for the driver's lower body and legs. As the expansion gas is directed downwards by the diffuser panel 425, the lower portion of the main airbag cushion may inflate more rapidly, allowing it to extend over the steering wheel. In this way, the diffuser panel 425 may help to prevent the occupant's knees or lower extremities from impacting the steering column or lower dashboard area during a collision event.

In some implementations, the support airbag cushion 420 of FIGS. 4A and 4B may be configured with a wider lateral profile than the support airbag cushion 220 of FIGS. 2A and 2B to provide similar support despite the absence of external side tethers. The support airbag cushion 420 can achieve structural stability and resistance to deformation through its increased width rather than relying on external tethering elements. The wider configuration of the support airbag cushion 420 may provide enhanced lateral stability and increased surface area for force distribution, allowing the support airbag cushion 420 to maintain its deployed shape and resist compression forces from the main airbag cushion. The internal side tethers 422 of the support airbag cushion 420 can work in conjunction with the increased width to provide controlled deployment and shape retention, allowing the support airbag cushion 420 to function effectively as a support structure for a main airbag cushion without external tethers.

In some implementations, the support airbag cushion 420 may contact an instrument panel on lateral sides of the support airbag cushion 420 to provide structural support and resistance to deformation. The wider profile of the support airbag cushion 420 can enable lateral surfaces of the support airbag cushion 420 to engage with side walls or lateral portions of the instrument panel during deployment. The contact between the lateral sides of the support airbag cushion 420 and the instrument panel can provide reaction forces that resist lateral movement and deformation of the support airbag cushion 420, similar to the function provided by the external side tethers 222 of the support airbag cushion 220. The lateral contact points can transfer forces from the support airbag cushion 420 to the instrument panel structure, allowing the support airbag cushion 420 to maintain its deployed shape and provide stable support to a main airbag cushion. The internal side tethers 422 can work in conjunction with the lateral contact to distribute forces throughout the support airbag cushion 420 and maintain structural integrity during impact events. This configuration can allow the support airbag cushion 420 to achieve similar performance characteristics as the externally tethered support airbag cushion 220 while using a different structural approach that utilizes contact with vehicle surfaces rather than external tethering elements.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

As used herein, inboard refers to a direction toward a centerline of a vehicle and outboard refers to a direction out of the vehicle and away from a centerline of the vehicle.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle seating position" refers to the position in which an occupant is generally positioned when seated in a seat of a vehicle. The term "occupant" refers to a person or crash test dummy within a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly, comprising:
an inflator to supply inflation gas;
a main airbag cushion configured to receive the inflation gas to expand and deploy from a housing located in an instrument panel of a vehicle toward a seating position of the vehicle, the main airbag cushion including an impact surface configured to constrain movement of an occupant in a forward direction relative to the vehicle; and
a support airbag cushion configured to receive the inflation gas to expand and deploy from the housing located in the instrument panel of the vehicle toward the seating position of the vehicle to support the main airbag cushion, the support airbag cushion comprising:
side tethers configured to constrain an upward expansion of the support airbag cushion and impart stiffness to the support airbag cushion in the forward direction, wherein the side tethers are coupled to the housing at a first end and coupled to an upper surface of the support airbag cushion at a second end, and wherein the support airbag cushion is substantially centered above the housing when deployed and a width of the side tethers extends along at least a quarter of a length of the support airbag cushion in the forward direction to limit rotation of the support airbag cushion; and
a support surface configured to restrain movement of the main airbag cushion in the forward direction.

2. The airbag assembly of claim 1, wherein the support surface is configured to form a combined surface with a surface of a steering wheel.

3. The airbag assembly of claim 1, wherein the support airbag cushion is twice as long in the forward direction as in a lateral direction perpendicular to the forward direction.

4. The airbag assembly of claim 1, wherein the support airbag cushion includes a second support surface configured to contact the instrument panel of the vehicle.

5. The airbag assembly of claim 1, further comprising a vent in the support surface to provide the inflation gas to the main airbag cushion and one or more of baffles and valves at the vent to maintain an inflation pressure of the support airbag cushion higher than an inflation pressure of the main airbag cushion.

6. The airbag assembly of claim 1, wherein the support airbag cushion comprises a support surface panel and two side panels, and wherein the side tethers are coupled to the support airbag cushion at a connection between the support surface panel and the two side panels.

7. The airbag assembly of claim 1, wherein the support airbag cushion includes exposed seams on an external surface of the support airbag cushion.

8. A support airbag cushion configured to expand and deploy from a housing located in an instrument panel forward of a main airbag cushion in a vehicle to support the main airbag cushion, the support airbag cushion comprising:

side tethers configured to constrain an upward expansion of the support airbag cushion and impart stiffness to the support airbag cushion in a forward direction relative to the vehicle, wherein the side tethers are coupled to the housing at a first end and coupled to an upper surface of the support airbag cushion at a second end, and wherein the support airbag cushion is substantially centered above the housing when deployed and a width of the side tethers extends along at least a quarter of a length of the support airbag cushion in the forward direction to limit rotation of the support airbag cushion;

a support surface rearward of the housing configured to restrain movement of the main airbag cushion in the forward direction; and a second support surface forward of the housing configured to contact a plane of the instrument panel to transfer a reaction force from the instrument panel to the main airbag without contacting a windshield of the vehicle.

9. The support airbag cushion of claim 8, wherein the support surface is configured to form a combined surface with a surface of a steering wheel.

10. The support airbag cushion of claim 8, wherein the support airbag cushion is twice as long in the forward direction as in a lateral direction perpendicular to the forward direction.

11. The support airbag cushion of claim 8, further comprising a vent in the support surface to provide inflation gas to the main airbag cushion and one or more of baffles and valves at the vent to maintain an inflation pressure of the support airbag cushion higher than an inflation pressure of the main airbag cushion.

12. The support airbag cushion of claim 8, wherein the support airbag cushion comprises a support surface panel and two side panels, and wherein the side tethers are coupled to the support airbag cushion at a connection between the support surface panel and the two side panels.

13. The support airbag cushion of claim 8, wherein the support airbag cushion includes exposed seams on an external surface of the support airbag cushion.

14. The support airbag cushion of claim 8, wherein a width of the side tethers extends along at least a quarter of a length of the support airbag cushion in the forward direction.

15. An airbag assembly, comprising:

an inflator to supply inflation gas;

a main airbag cushion configured to receive the inflation gas to expand and deploy toward a seating position of a vehicle, the main airbag cushion including an impact surface configured to constrain movement of an occupant in a forward direction relative to the vehicle; and a support airbag cushion configured to receive the inflation gas to expand and deploy from a position forward of the main airbag cushion toward the seating position of the vehicle to support the main airbag cushion, the support airbag cushion comprising:

side tethers configured to constrain an upward expansion of the support airbag cushion and impart stiffness to the support airbag cushion in the forward direction; and a support surface configured to restrain movement of the main airbag cushion in the forward direction, wherein the support airbag cushion comprises a support surface panel and two side panels, and wherein the side tethers are coupled to the support airbag cushion at a connection between the support surface panel and the two side panels.

\* \* \* \* \*